May 12, 1959   R. K. ILER ET AL   2,886,466
COMPOSITION, PROCESS, AND PRODUCT
Filed July 31, 1956
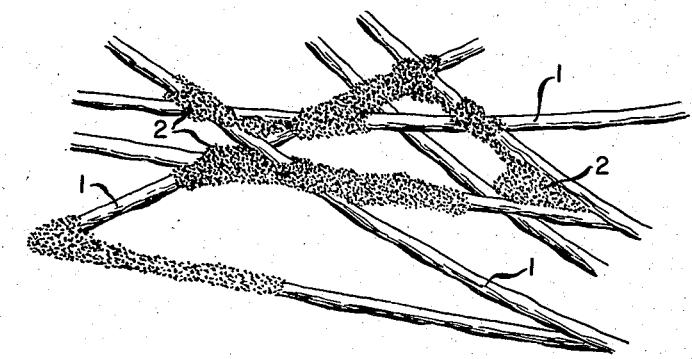
INVENTORS
RALPH K. ILER
ARTHUR G. JELINEK
BY *Fred C. Carlson*
ATTORNEY

United States Patent Office 2,886,466
Patented May 12, 1959

2,886,466

COMPOSITION, PROCESS, AND PRODUCT

Ralph K. Iler and Arthur G. Jelinek, Brandywine Hundred, Del., assignors to E. I. du Pont de Nemours and Company, Wilmington, Del., a corporation of Delaware Application July 31, 1956, Serial No. 601,122

12 Claims. (Cl. 117—65)

This invention relates to compositions and processes for binding inorganic fibers and to the products produced, and is more particularly directed to such compositions comprising a silica sol, a clay, and an aluminum salt, to processes comprising mixing inorganic fibers with said composition, drying the mixture, and heating the dried mixture to an elevated temperature, and to the products comprising a mass of inorganic fibers firmly bound together with the silica-alumina-clay-containing binder resulting from the heating of the sol-clay-salt mixture at elevated temperature.

In the drawing a product of the invention is illustrated as it appears under the light microscope at about 300 diameters magnification. Inorganic fibers 1 are held together at their points of juncture with a deposited mass 2 of the silica-alumina-clay-containing binder resulting from the described bonding processes, and the binder having a pH in the range of 2 to 7.5 and a solids content of from 1 to 60% by weight.

Inorganic fibers, and mineral fibers generally, can be bonded into useful products such as paper, insulation block, and the like, by techniques with which the art is already familiar. Numerous binders have been used for this purpose, but are subject to one disadvantage or another so that there has been a need for improved binders for this purpose.

Organic binders, especially synthetic resins, have been used but are subject to decomposition at elevated temperatures. Since the value of inorganic fiber insulation is greatest at high temperatures this deficiency of organic resins is especially undesirable.

Inorganic materials, such as silica sols, clay suspensions and the like, have been used as binders, either alone or in combination. Such systems are thermally stable but unfortunately the bonded articles lack mechanical strength so that the inorganic binders heretofore available have left much to be desired.

Now according to the present invention it has been found that by incorporating a component yielding aluminum ions in solution into colloidal silica-sol-clay compositions in suitable proportions novel and especially advantageous bonding materials are produced, and that by employing such a binder with inorganic fibers and drying the mixture, formed articles are produced having improved strength, especially after exposure to high temperatures. The binder compositions advantageously can contain modifying agents for special purposes.

The effect of adding the component yielding aluminum ions, such as an aluminum salt, is quite unexpected, since it has been known that polyvalent ions generally, and especially aluminum ions, will precipitate silica sols as gels having little or no value as binders. Evidently in the compositions of the present invention there is a synergism between the aluminum ion, the silica sol, and the clay, when these components are present in the critical proportions, and this synergistic cooperation gives rise to the highly advantageous and useful binder properties.

The colloidal silica sol used in compositions of the present invention ordinarily is an aquasol, but organosols are also effective and sometimes are even preferred as, for example, when the fibers to be bonded are hydrophobic and hence difficult to wet.

The art is already familiar with methods of making silica sols. Repeptizing a silica gel, as described in United States Patents 1,835,420 to Neundlinger or 2,375,738 to White or 2,724,701 to Legal, is a common method. Organosols can be made by such methods as mixing solutions of sodium silicate and acid and precipitating the metathetically formed salt by adding a large proportion of an organic liquid. Methods adapted to give relatively small silica particles include removing sodium ions from sodium silicate with ion-exchange resins as taught in Bird United States Patent 2,244,325 and Voorhees United States Patent 2,457,971.

Especially preferred for use in the binders of the present invention, however, are the sols of dense, substantially discrete, amorphous silica particles prepared by controlled growth of the particles as described in United States Patents 2,574,902 to Bechtold and Snyder, 2,577,- 485 to Rule, and 2,705,345 to Alexander. These sols contain a type of particle which appears to give superior strength to the binder compositions. They ordinarily contain from 12 to 35% $SiO_2$.

The silica sol should contain silica particles in the size range of 3 to 150 millimicrons ($m\mu$) in average diameter. It is preferred to use sols of 10 to 50 $m\mu$ particles, and sols of discrete, substantially spherical amorphous silica particles 12 to 20 $m\mu$ in diameter are of greatest suitability.

While a large number of silica sols which give excellent results are thus available, it will be understood that the low-molecular-weight, unstable sols containing particles smaller than 3 millimicrons in diameter and prepared by such methods as merely neutralizing sodium silicate with acid without subsequent stabilization are not practicable and to be avoided.

As the clay in a binder of this invention there can be used any of the complex silicates commonly referred to by this term. Montmorillonites, including bentonite, which swell in water, can be employed, but their tendency to hold large proportions of bound water and to be dimensionally unstable make them less desirable. Clays of special properties, such as attapulgite and halloysite, can be used, often to advantage, but their limited occurrence in nature and consequent higher cost restricts their adoption on a large scale.

Non-swelling clays of the kaolinite type, specifically kaolins, are especially preferred. These are widely available at very low cost, and since they have substantial dimensional stability in water, problems such as undue thickening of the binder and difficulties occurring during drying are obviated.

The clay particles should be less than 10 microns in diameter and at least 50% by weight should be less than 2 microns in diameter. The suitability of a clay as to particle size can readily be ascertained by examination under an ordinary light microscope or by conventional sedimentation tests.

The component of the binder supplying the aluminum ions can be any water-soluble aluminum compound, organic or inorganic, which is soluble in water and ionizes in solution in a manner such that $Al^{+++}$ ions are formed and the aluminum is not tied up in an unionizable form, in a complex. Soluble salts of strong, inorganic acids, such as aluminum sulfate, aluminum chloride, basic aluminum chloride, aluminum nitrate, and aluminum sulfamate can be used. However, water-soluble salts and basic salts of organic acids, especially monobasic carboxylic acids such as formic and acetic acids, are preferred. Thus among the preferred aluminum salts are included aluminum formate and basic formate, aluminum acetate and basic acetate, and aluminum formoacetate.

The proportions of silica, clay, and aluminum ion are critical for obtaining the above-mentioned synergistic action in the binder compositions of this invention. If the colloidal silica in the sol is expressed as $SiO_2$ and the aluminum ion is expressed as $Al_2O_3$, the proportions of components by weight can be in the broad range:

$1SiO_2$:.5 to 10 clay:0.1 to .0025$Al_2O_3$

The preferred range, on the same basis, is:

$1SiO_2$:1 to 3 clay:.04 to .01$Al_2O_3$

It will be seen that while there is enough latitude in proportions to permit commercial operability, the ranges of proportions are nevertheless relatively narrow.

The total solids in the liquid binder should be in the range from 1 to 60% by weight and preferably from 5 to 30%.

The pH of the binder should be from 2 to about 7.5.

It will be understood that organic modifiers can be included in the binder compositions with unique and unobvious effects. Formaldehyde condensation resins and starches are in this class of modifiers. So, also, is a glycol-urea borate composition sold as "Tybon" 1016B by Booty Resiners, Newark, Ohio, in aqueous paste form having a 33% solids content. The proportion of such modifiers will in general be a minor part of the binder—that is, not more than about 5% by weight.

Other, more conventional binder additives can also be included, such as fillers, bodying agents, adhesives, resin products, wetting agents, anti-oxidants, and anti-punking agents, again in minor proportion.

In making the binder the components above-described are mixed together to give a uniform suspension. The components can be added in any order; it is preferred, however, to disperse the clay in the silica sol containing any desired modifiers, to take advantage of the good dispersing characteristics of the clay-silica sol mixtures. If the mixture does not have a pH well down in the range of 2 to 7.5 it is then preferable to add an acid to avoid subsequent bodying effects on the aluminum salt. The acid used can be any of the common inorganic acids, such as hydrochloric or sulfuric, or the water-soluble organics, especially of the lower aliphatic type, such as formic or acetic, with or without substituents such as chloride, bromide, hydroxide groups. However, acids known to have an insolubilizing effect on aluminum salts should not be used. Finally, in a preferred process, the aluminum salt, preferably as a concentrated solution, is added and mixed with the other ingredients.

The colloidal silica-clay-aluminum ion compositions of the present invention exhibit outstanding advantages as binders for inorganic fibers, particularly where such fibers are to be used as formed bodies such as insulation block. Inorganic fibers, such as mineral fibers, have already been bonded into shaped masses using organic resin binders, but such masses lose their strength at high temperatures because the binder is melted or decomposed. With binders of this invention outstanding improvement in the strength of the bonded masses of fibers at elevated temperatures is noted.

Included among the inorganic fibers which can be so bonded are glass fibers, rock wool, asbestos fibers, and synthetic inorganic fibers, such as alumino silicate fibers.

It is to be noted that in the bonding processes of this invention the binder does not demonstrate its strength advantage until the fiber masses containing the binder have been dried and heated to elevated temperature, that is, at from 300° C. to the softening temperature of the fibers. It is necessary to hold the binder-impregnated fiber masses in shape at least until the binder has dried. This can be done, for instance in the case of glass fiber block insulation, by bonding the fibers with—say, 1 to 10% of their weight—of a conventional resin binder such as alkyd or phenolformaldehyde resin, and thereafter saturating the fiber block with the silica sol-clay-aluminum ion binder. On the other hand it will be evident that the fibers can be maintained in the desired physical shape until dry, by mechanical methods such as molding, or, in the case of asbestos paper, for example, by applying the binder to the sheet on the paper-forming machine.

The preferred method of applying the binder to formed glass fiber insulation block is by vacuum impregnation. The block is subjected to a vacuum to reduce the pressure in the pores, and the block is then submerged in the binder. Alternatively, the binder dispersion can be flowed over the top of the block and suction can be applied underneath. It is possible to regulate the amount of binder applied by subjecting the saturated block to controlled drainage, or by varying the solids content of the binder.

Following impregnation of the inorganic fiber mass with the binder by such methods as immersion or spraying, or by mixing the unformed fibers with the binder and then forming them, the formed mass is dried. A very suitable means of drying is in air-circulating ovens at a temperature of up to 260° C., but lower temperatures (70–100° F.) can be used and equivalent means, such as dielectric drying, will be readily apparent to those skilled in the art.

After drying, the bonded fibers can be subjected to temperatures in excess of 300° C. if desired, to burn out any organic constituents present.

The binder-solids content of the dried fiber mass should be in the range from 5 to 50% by weight. Ordinarily an amount in the range of 15 to 35% gives optimum results and is preferred.

The bonded articles show excellent compressive strength, and are not fragile or brittle as is the case with many organic binders. As compared with articles bonded with silica sol-clay compositions containing no aluminum ion, the articles have as much as 100% greater compressive strength, as shown, for instance, by conventional testing methods using the Tinius-Olsen or Instron Tensile Testers.

The bonded articles are useful as thermal insulation, sound absorbent materials, filter media, and on other uses where improved bond strength of inorganic fibers is desired.

The invention will be better understood by reference to the following illustrative examples, in addition to those already given. In the examples, all parts and percentages are by weight unless otherwise stated.

EXAMPLE 1

A binder composition was made with colloidal silica sol, clay, and a component supplying aluminum ions. The silica sol was prepared according to a method of Rule U.S. Patent 2,577,485, contained 30% by weight of silica as $SiO_2$, had an $SiO_2$:$Na_2O$ weight ratio of 285:1, and the average particle diameter of the silica was 17 millimicrons.

The clay used was a Georgia kaolin identified as #2975 (Canary type), supplied by the Georgia Pigment Co., Sandersville, Ga., and showed the following particle sizes by a sedimentation test:

100% less than 10 microns
95% less than 5 microns
77% less than 2 microns

To make the binder, 417 parts of the 30% silica sol were diluted with 835 parts of water and 250 parts of the clay were added slowly, with rapid agitation. Then a mixture of 375 parts of "Tybon" 1016B anti-punking agent and 209 parts of water was added with stirring. The mixture was diluted with 3325 parts of water and stirred vigorously, giving a dispersion having a solids content of 9.3% and a pH of 6.5 to 7.00.

The mixture was then acidified by adding enough 25% formic acid (60 parts) to lower the pH to the range of 3.2 to 3.5. The aluminum ion was then added in the form of 31 parts of basic aluminum formate solution containing aluminum ion equivalent to 8.5% $Al_2O_3$. One part of a wetting agent ("Triton" X-114) was then added.

This binder was used in making an article of the invention by saturating glass fiber insulation block preformed and bonded with alkyd resin. The vacuum saturation technique already described was used and a 400% uptake of the 9.3% solids dispersion, followed by draining, resulted in an average binder content of 27% in the dried block.

The treated blocks were dried in an air-circulating oven at 260° C. The resulting blocks had excellent strength. To demonstrate the retention of strength at high temperature the blocks were heated in an air-circulating oven for 24 hours at 370° C. This resulted in slow oxidative degradation of the alkyd resin binder originally in the blocks, as well as the "Tybon" and wetting agent added; nevertheless the blocks retained nearly all of their original compressive strength. In contrast, blocks made and treated in identical manner except without the aluminum ion present retained only half their compressive strength after the high temperature heating.

Also, the binder was used to bond asbestos fibers (Grade 6D 20, Canadian Johns-Manville Co., Ltd.) at 30% retention, in the formation of a thin sheet. Excellent bonding was attained, and it was noted that there was decidedly better bonding in the sheet than in a comparable sheet in which the binder contained no aluminum salt.

EXAMPLES 2–12

In these examples binder compositions were made in a manner similar to that described in Example 1 but using other components, in different proportions, as indicated in Table 1. These binders were used for impregnating glass fiber block, with the beneficial results observed in Example 1.

Table 1

| Example No. | $SiO_2$ Particles, mμ | Clay | Aluminum Salt | Ratio, $SiO_2$:Clay:$Al_2O_3$:X [1] |
|---|---|---|---|---|
| 2 | 17 | kaolin | sulfate | 1:2:.0025:1 |
| 3 | 17 | ball | nitrate | 1:10:.04:.5 |
| 4 | 150 | bond | basic formate | 1:4:.01:.5 |
| 5 | 17 | attapulgite | acetate | 1:.5:.0025:.5 |
| 6 | 17 | rembest | basic formate | 1:2.5:.04:2 |
| 7 | 60 | kaolin | basic chloride | 1:3:.02:.5 |
| 8 | 17 | coating | acidified hydroxide | 1:3:.0025:.1 |
| 9 | 30 | bond | ammonium alum | 1:4:.02:.02 |
| 10 | 17 | bleaching | sulfate | 1:2:.04:0 |
| 11 | 17 | ceramic | nitrate | 1:3:.01:.5 |
| 12 | 60 | ball | basic formate | 1:2.5:.0025:.05 |

[1] X stands for organic modifier, as follows:
Examples 2, 4, 6—"Tybon" 1062-B.
Example 3—Papermaker's starch.
Example 5—Urea.
Example 7—Water-soluble starch.
Example 8—Polyvinyl acetate emulsion.
Example 9—Ortho-cresol.
Example 10—None.
Example 11—Water-soluble borated alkyd resin.
Example 12—Glyceryl borate.

We claim:

1. A binder composition comprising a sol of silica particles having an average diameter of 3 to 150 millimicrons, a clay having a particle size less than 10 microns, and a soluble aluminum compound which in solution forms aluminum ions, the weight proportions of the silica of the sol expressed as $SiO_2$, the clay, and the aluminum compound expressed as $Al_2O_3$ being in the range of 1:0.5 to 10.0:0.1 to .0025, and the binder having a pH in the range of 2 to 7.5 and a solids content of from 1 to 60% by weight.

2. A binder composition comprising a sol of silica particles having an average diameter of 3 to 150 millimicrons, a clay having a particle size less than 10 microns, a soluble aluminum compound which in solution forms aluminum ions, and an organic modifier, the weight proportions of the silica of the sol expressed as $SiO_2$, the clay, and the aluminum compound expressed as $Al_2O_3$ being in the range of 1:0.5 to 10.0:0.1 to .0025, and the binder having a pH in the range of 2 to 7.5 and a solids content of from 1 to 60% by weight.

3. A binder composition comprising a sol of silica particles having an average diameter of 3 to 150 millimicrons, a clay having a particle size less than 10 microns, a soluble aluminum compound which in solution forms aluminum ions, and a glycol-urea borate, the weight proportions of the silica of the sol expressed as $SiO_2$, the clay, and the aluminum compound expressed as $Al_2O_3$ being in the range of 1:0.5 to 10.0:0.1 to .0025, and the binder having a pH in the range of 2 to 7.5 and a solids content of from 1 to 60% by weight.

4. A binder composition comprising a sol of silica particles having an average diameter of 3 to 150 millimicrons, a kaolinite type clay having a particle size less than 10 microns and a soluble aluminum compound which in solution forms aluminum ions, the weight proportions of the silica of the sol expressed as $SiO_2$, the clay, and the aluminum compound expressed as $Al_2O_3$ being in the range of 1:0.5 to 10.0:0.1 to .0025, and the binder having a pH in the range of 2 to 7.5 and a solids content of from 1 to 60% by weight.

5. A binder composition comprising a sol of silica particles having an average diameter of 3 to 150 millimicrons, a clay having a particle size less than 10 microns, and an aluminum salt of a monobasic carboxylic acid which in solution forms aluminum ions, the weight proportions of the silica of the sol expressed as $SiO_2$, the clay, and the aluminum compound expressed as $Al_2O_3$ being in the range of 1:0.5 to 10.0:0.1 to .0025, and the binder having a pH in the range of 2 to 7.5 and a solids content of from 1 to 60% by weight.

6. A binder composition comprising an aquasol of dense, substantially discrete, amorphous silica particles having an average diameter of from 10 to 50 millimicrons, a kaolinite-type clay having a particle size less than 10 microns, and an aluminum salt of a monobasic carboxylic acid which in solution forms aluminum ions, the weight proportions of the silica of the sol expressed as $SiO_2$, the clay, and the aluminum compound expressed as $Al_2O_3$ being in the range of 1:0.5 to 10.0:0.1 to 0.0025, and the binder having a pH in the range of 2 to 7.5 and a solids content of from 1 to 60% by weight.

7. A binder composition comprising an aquasol of dense, substantially discrete, amorphous silica particles having an average diameter of from 12 to 20 millimicrons, a kaolin having an average particle size less than 10 microns, and an aluminum formate, the weight proportions of the silica of the sol expressed as $SiO_2$, the kaolin, and the aluminum formate expressed as $Al_2O_3$ being in the range of 1:0.5 to 10.0:0.1 to 0.0025, and the binder having a pH in the range of 2 to 7.5 and having a solids content of from 5 to 30% by weight.

8. In a process for binding inorganic fibers the steps comprising mixing with the fibers a binder comprising a sol of silica particles having an average diameter of 3 to 150 millimicrons, a clay having a particle size less than 10 microns, and a soluble aluminum compound which in solution forms aluminum ions, the weight proportions of the silica of the sol expressed as $SiO_2$, the clay, and the aluminum compound expressed as $Al_2O_3$ being in the range of 1:0.5 to 10.0:0.1 to .0025, the proportion of binder to fiber being from 0.05:1 to 0.5:1 on the dry basis, and the binder having a pH in the range of 2 to 7.5 and a solids content of 1 to 6% by weight, drying the mixture, and heating the dried product to above 300° C.

9. In a process for binding inorganic fibers the steps comprising forming a shaped mass of the fibers, impregnating the mass with a binder comprising an aquasol of dense, substantially discrete, amorphous silica particles having an average diameter of from 12 to 20 millimicrons, a kaolin having an average particle size less than 10 microns, and an aluminum formate, the weight proportions of the silica of the sol expressed as SiO$_2$, the kaolin, and the aluminum formate expressed as Al$_2$O$_3$ being in the range of 1:0.5 to 10.0:0.1 to .0025, and the binder having a pH in the range of 2 to 7.5 and having a solids content of from 5 to 30% by weight, the proportion of binder in the inorganic fibers being from 5 to 50% by weight on the dry solids basis, drying the binder-impregnated fibers at a temperature up to 260° C., and then heating the dried product to above 300° C.

10. A bonded inorganic fiber article comprising a shaped mass of inorganic fibers bonded with the dried and heated residue of a binder comprising a sol of silica particles having an average diameter of 3 to 150 millimicrons, a clay having a particle size less than 10 microns, and a soluble aluminum compound which in solution forms aluminum ions, the weight proportions of the silica of the sol expressed as SiO$_2$, the clay, and the aluminum compound expressed as Al$_2$O$_3$ being in the range of 1:0.5 to 10.0:0.1 to .0025, the proportion of binder to fiber being from 0.05:1 to 0.5:1 on the dry basis, and the binder having a pH in the range of 2 to 7.5 and a solids content of 1 to 60% by weight, drying having been effected at a temperature of up to 260° C. and heating having been effected at a temperature of above 300° C.

11. A bonded inorganic fiber article comprising a block of glass fibers bonded with the dried and heated residue of a binder comprising an aquasol of dense, substantially discrete, amorphous silica particles having an average diameter of from 12 to 20 millimicrons, a kaolin having an average particle size less than 10 microns, and an aluminum formate, the weight proportions of the silica of the sol, expressed as SiO$_2$, the kaolin, and the aluminum formate expressed as Al$_2$O$_3$ being in the range of 1:0.5 to 10.0:0.1 to .0025, said residue being present in the proportion of 15 to 35% by weight and drying having been effected at a temperature of up to 260° C. and heating having been effected at a temperature of above 300°C.

12. A bonded inorganic fiber article comprising a sheet of asbestos fibers bonded with the dried and heated residue of a binder comprising an aquasol of dense, substantially discrete, amorphous silica particles having an average diameter of from 12 to 20 millimicrons, a kaolin having an average particle size less than 10 microns, and an aluminum formate, the weight proportions of the silica of the sol, expressed as SiO$_2$, the kaolin, and the aluminum formate expressed as Al$_2$O$_3$ being in the range of 1:0.5 to 10.0:0.1 to .0025, said residue being present in the proportion of 15 to 35% by weight and drying having been effected at a temperature of up to 260°C. and heating having been effected at a temperature of above 300° C.

References Cited in the file of this patent

UNITED STATES PATENTS

| Number | Name | Date |
|---|---|---|
| 1,468,149 | Gerlach | Sept. 18, 1923 |
| 1,582,117 | Blombery | Apr. 27, 1926 |
| 2,252,157 | Bergin et al. | Aug. 12, 1941 |
| 2,276,315 | Kirk | Mar. 17, 1942 |
| 2,309,962 | Kraus | Feb. 9, 1943 |
| 2,500,665 | Courtright | Mar. 14, 1950 |
| 2,554,035 | Kreyling | May 22, 1951 |
| 2,577,485 | Rule | Dec. 4, 1951 |
| 2,597,872 | Iler | May 27, 1952 |
| 2,657,183 | Bechtold | Oct. 27, 1953 |
| 2,695,549 | Quinn | Nov. 30, 1954 |